United States Patent [19]
Kestler

[11] 3,755,904
[45] Sept. 4, 1973

[54] MARKING INSTRUMENT FOR DENTAL CASTINGS

[75] Inventor: Ralph Kestler, Houston, Tex.

[73] Assignee: General Control Corporation, Houston, Tex.

[22] Filed: Jan. 29, 1971

[21] Appl. No.: 110,906

[52] U.S. Cl. .................. 33/18 R, 33/20, 33/76
[51] Int. Cl. ............................ B43l 13/00
[58] Field of Search ............... 33/26, 27 R, 27 C, 33/27 D, 174 D, 32 C, 1 AA, 75 R

[56] References Cited
UNITED STATES PATENTS

| | | | |
|---|---|---|---|
| 1,927,992 | 9/1933 | Pulver | 33/189 |
| 3,548,503 | 12/1970 | Feltenberger | 33/26 |
| 1,296,643 | 3/1919 | Fish | 33/174 D |
| 1,864,804 | 6/1932 | Clark | 33/174 D |
| 2,621,406 | 12/1952 | McPhee | 33/174 D |

FOREIGN PATENTS OR APPLICATIONS

| 22,117 | 10/1913 | Great Britain | 33/75 R |
|---|---|---|---|

Primary Examiner—Louis R. Prince
Assistant Examiner—Charles E. Phillips
Attorney—Michael P. Breston and Alfred B. Levine

[57] ABSTRACT

An instrument is provided for applying trimming lines on the surfaces of castings, such as dental castings. The instrument has a calibrated base member defining a circular track for rotatably supporting a collar means. Marker guide means are movably associated with the collar means to allow marker lines to be drawn on the upper surface or outer periphery of the casting in dependence upon the position of the guide means on the collar, or the angular position of the collar relative to the base.

3 Claims, 12 Drawing Figures

Patented Sept. 4, 1973 3,755,904

INVENTOR.
RALPH KESTLER,
BY
MICHAEL P. BRESTON
ATTORNEY.

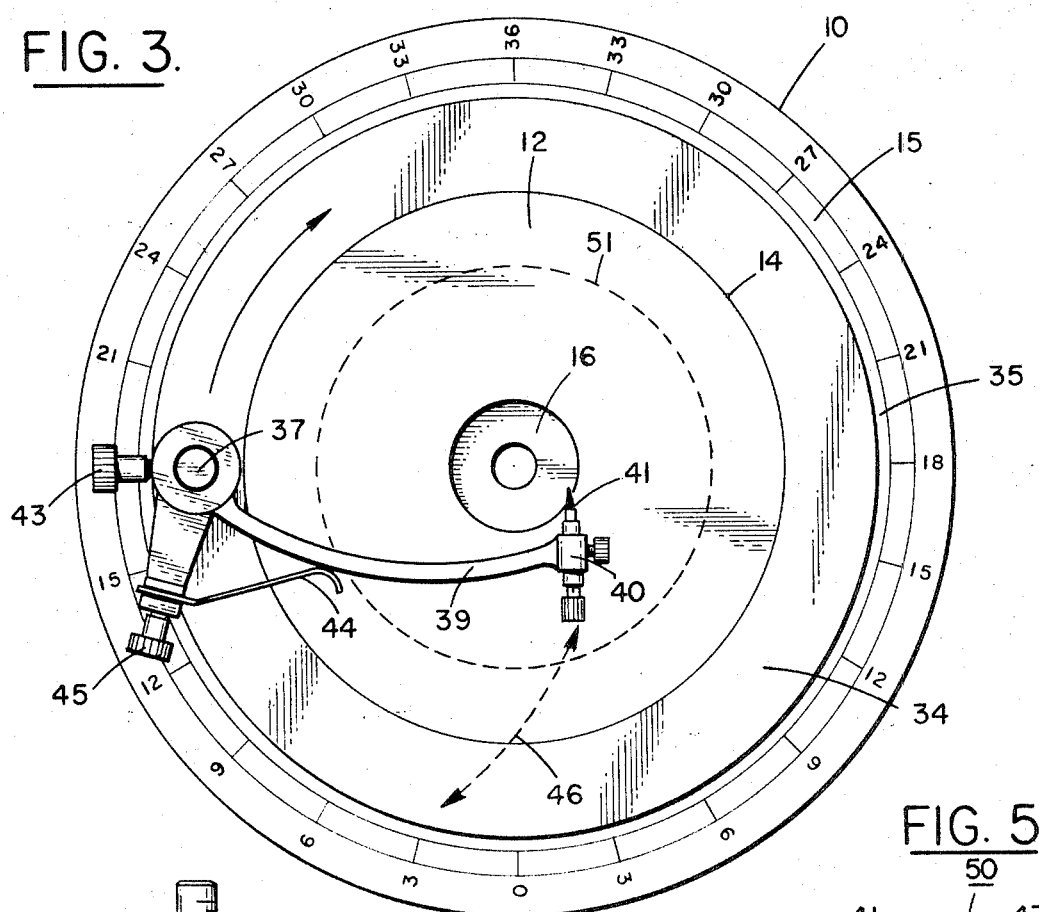
FIG. 3.
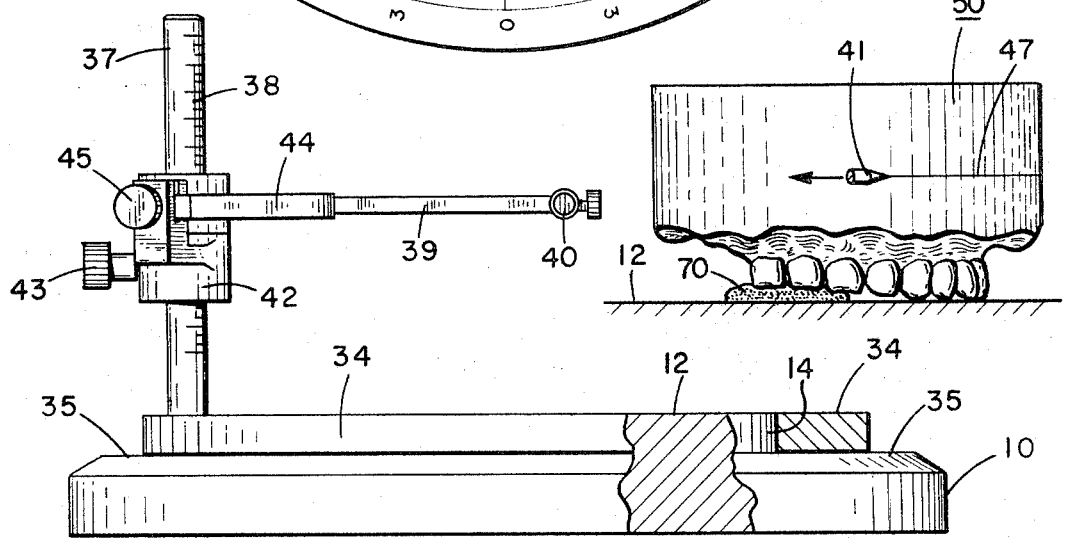
FIG. 4.
FIG. 5.
INVENTOR.
RALPH KESTLER
BY
MICHAEL P. BRESTON
ATTORNEY.

Patented Sept. 4, 1973 3,755,904
4 Sheets-Sheet 3
FIG. 6.
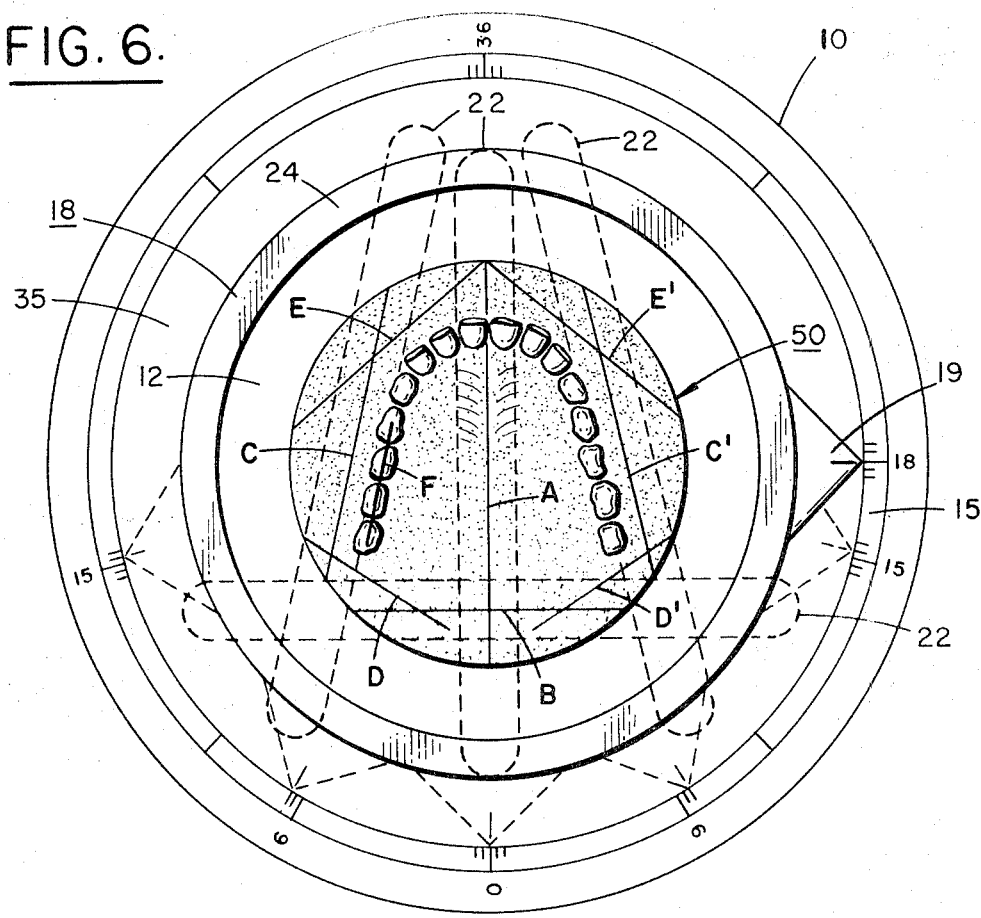
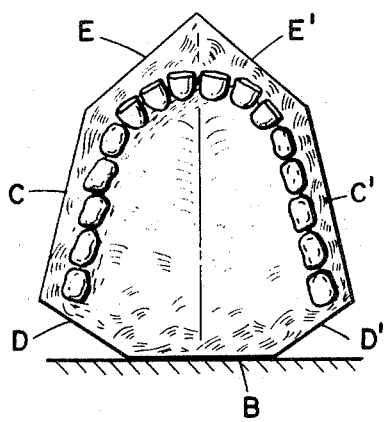
FIG. 8.
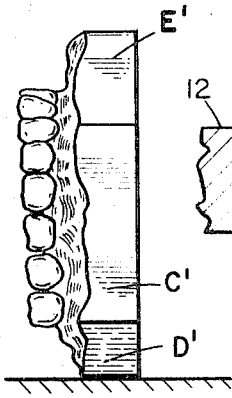
FIG. 9.
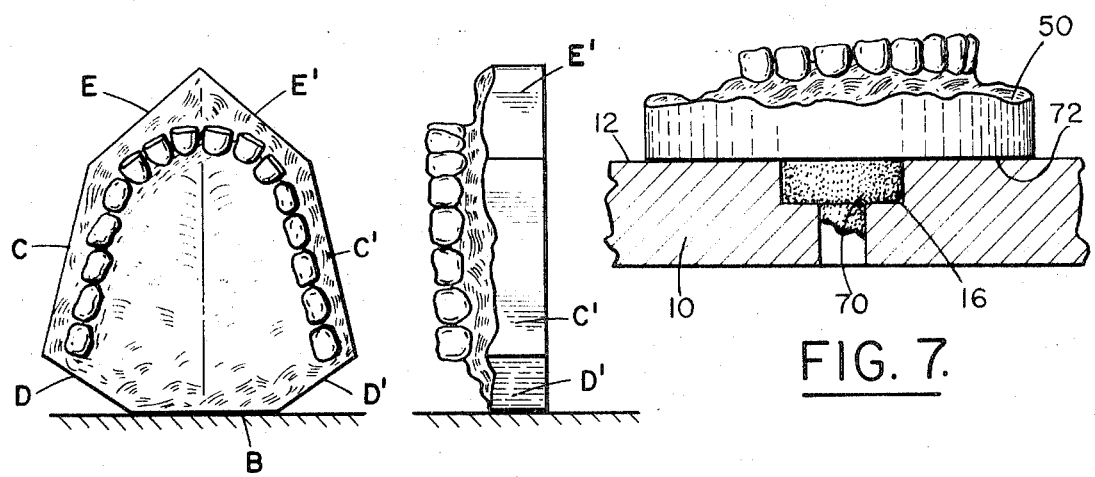
FIG. 7.
INVENTOR.
RALPH KESTLER,
BY
MICHAEL P. BRESTON.
ATTORNEY.

Patented Sept. 4, 1973 3,755,904

INVENTOR.
RALPH KESTLER,
BY
MICHAEL P. BRESTON
ATTORNEY.

3,755,904

MARKING INSTRUMENT FOR DENTAL CASTINGS

BACKGROUND OF THE INVENTION

Prior methods of scribing marking lines on dental castings for trimming are awkward, inaccurate, and time-consuming due to the lack of instruments for aiding in the writing of such marking lines. For example, in marking the occlusal plane base line, a casting was placed on a base with its teeth facing down and the casting resting on several front teeth. With the casting supported in this position by dental putty, and with a make shift means to support a pencil at a selected height, a line was drawn parallel to the base surface.

Sometimes the pencil was held stationary at this level and the casting rotated by hand to scribe a desired line on the casting. The casting was trimmed to this scribed line and the flat surface thus obtained became the occlusal base line. With the teeth of the casting facing upwardly and the base line flat on the base surface, the casting was marked up with more lines for trimming. These lines included symmetrical lines on each side of the casting to form an angular pattern surrounding the outline of the teeth. Other times, these trimming lines were scribed on the casting by using a pencil, compass, and straight edge. There was also a need for establishing reference points to scribe intersection points, bisecting angles, etc.

Since these methods are practiced by expensive labor, it will be seen from the preceding description that there is a need for an instrument to assist in the aforementioned drawing operations, whereby lines can be drawn in an accurate and fast manner. The present invention allows lines to be accurately drawn to any desired angle on an undulated casting surface. It also provides means whereby sloping lines can be easily duplicated on either side of a casting, and the casting may be easily marked up for symmetrical lines. Other advantages of the present invention will be apparent from the following illustrative description and drawings.

SUMMARY OF THE DISCLOSURE

An instrument for applying trimming lines on the surfaces of a dental casting and the like, comprising a circular, calibrated base member, a circular coaxially aligned track formed on the base member, a collar means adapted to rotate around the track, marker guide means adapted to slide on the upper flat surface of the collar means for movement back and forth in a fixed line of travel, and a marker pen used with said guide means to draw lines in the horizontal plane on the upper surface of the casting.

A ring member can also be adapted for rotation around the track. A pivot post is vertically mounted on the upper flat surface of the ring member. A horizontally extending scriber arm has its one end pivoted about the post and its free end is spring biased toward the center of the ring. The free end of the arm is adapted to receive a marker pen for drawing lines on the outer periphery of the casting at any desired vertical elevation.

BRIEF DESCRIPTION OF THE DRAWINGS

FIG. 3 is a top plan view of the base and ring member;

FIG. 4 is an elevational view, partly in section, of the base and ring member;

FIG. 5 is an elevational view of a conventional maxillary casting prior to marking or trimming;

FIG. 6 is a view illustrating the manner of scribing trim lines unto the casting;

FIG. 7 shows the casting positioned on the base member;

FIGS. 8 and 9 are front and side views, respectively, of a trimmed casting;

Referring to FIGS. 1 and 2, there is shown a circular base member 10, formed to provide a raised circular center portion 12. The center of portion 12 is coaxial with the center of base 10. Portion 12 forms a peripheral circular shoulder 14. The outer edge of the upper surface of base 10 is graduated, as shown, to provide a 360° reference index 15. A coaxial bore or hole 16 is formed through or in base member 10.

Figure 1:
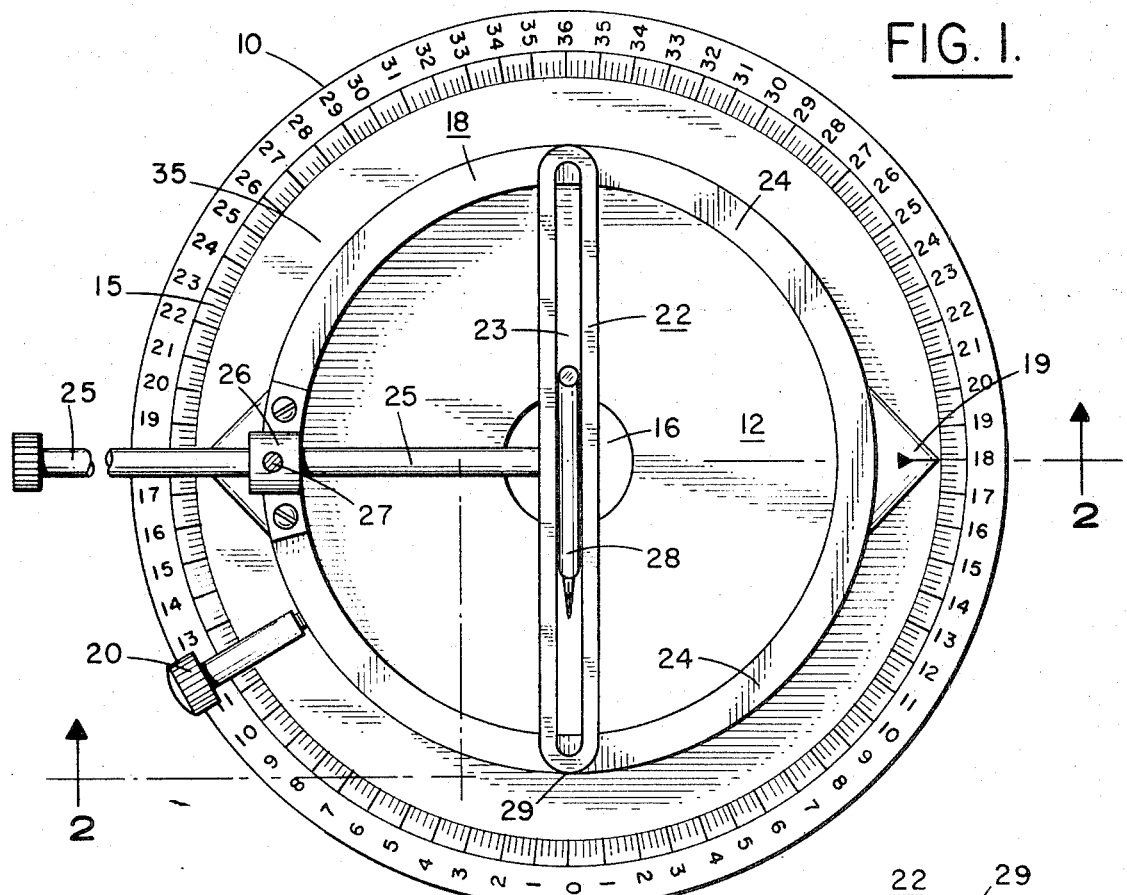
FIG. 1 is a top plan view of the instrument's base and collar means.

Shoulder 14 provides a circular guide or track for accepting a collar member 18. A pointer 19 extends from the outer wall of collar 18 to provide a reference for positioning collar 18 with relation to index 15. A locking screw 20 is threaded through the wall of collar 18 to engage shoulder 14 and to thereby releasably secure collar 18 against rotation on base 10. Collar 18 can be rotated and set to any desired angular position relative to index 15.

A scriber guide 22, having a slot 23, is positioned on the upper surface 24 of collar 18 and is adapted to slide back and forth thereon. Connected to guide 22 is a rod 25 which slides through a bearing sleeve 26 which is fixed, as shown, to surface 24 of collar 18. Rod 25 and sleeve 26 allow movement of guide 22 on surface 24 along a fixed line of travel. The length dimension of guide 22 and of slot 23 is preferably maintained perpendicular to pointer 19. Guide 22 is of sufficient length to span the outside diameter of collar 18. Likewise, slot 23 is long enough to span the inside diameter of collar 18, so that by placing a scriber or pen 28 in slot 23 and using the slot as a guide means, straight lines can be drawn on an object, such as a dental casting, positioned in the center of raised portion 12 below the guide means 22. A locking screw 27 is threaded through sleeve 26 to lock rod 28 in a selected position.

Figures 2, 2A:
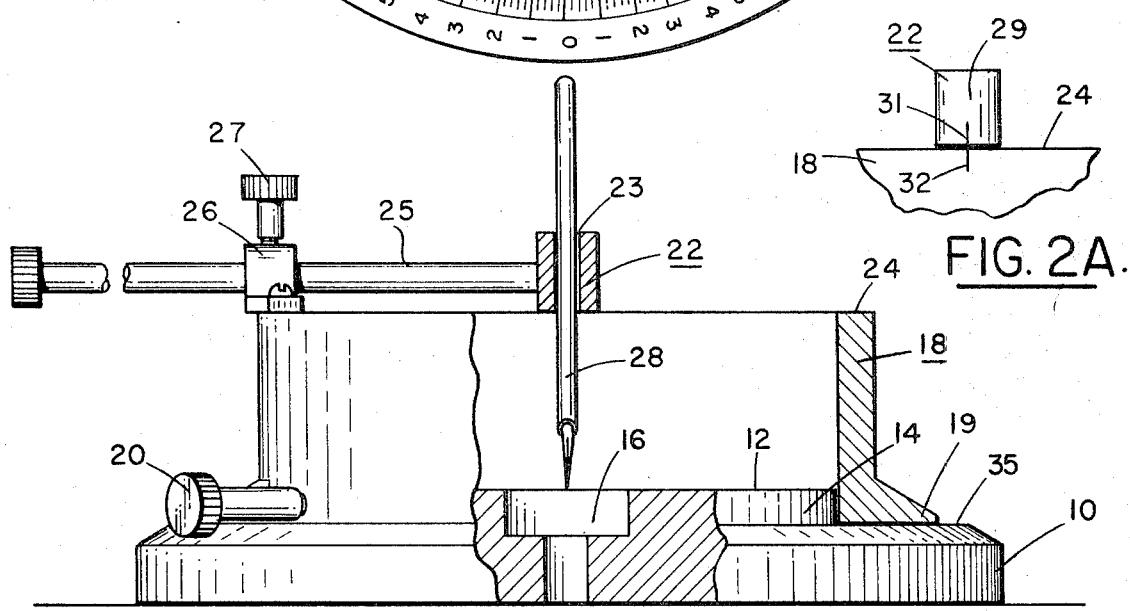
FIG. 2 is a view partly in section taken on line 2—2 in FIG. 1.
FIG. 2A is a fragmentary view showing the centering lines for the scriber guide.

One end 29 of guide 22 is marked, as shown in FIG. 2A, with a line 31 to line up with a mark 32 on collar 18, when guide 22 is centered across the collar.

Reference now is made to FIGS. 3 and 4. A circular flat ring 34 is now rotatably mounted on a surface 35 on base 10 about raised center portion 12. Mounted on the upper flat surface of ring 34 is a vertically extending post 37, which is provided with a graduated scale 38, as shown. Pivotally mounted on post 37 is a horizontally extending scriber arm 39 which carries on its free end 40 a pen or marker means 41. Arm 39 is supported on post 37 by a sleeve 42 slidably positioned on post 37 below the pivot point of arm 39. Sleeve 42 is provided with a locking screw 43 for fixing the vertical position of sleeve 42 and therefore of arm 39 on post 37. A biasing means, such as a leaf spring 44, is attached to sleeve 42 by a screw 45 for biasing the scriber arm 39 counterclockwise toward the center of ring 34, as indicated by the dashed, arrowed line 46. Scale 38 indicates the vertical position of marker pen 41 in relation to the top surface of base portion 12 of member 10. Marker 41 is adapted to draw a horizontal line such as line 47 (FIG. 5) on the outer periphery of a casting 50. The casting is positioned approximately in the center of base portion 12, as indicated by a dotted circle 51 (FIG. 3), and ring 34 is rotated on base 10 in a clockwise direction.

Figures 10, 11:
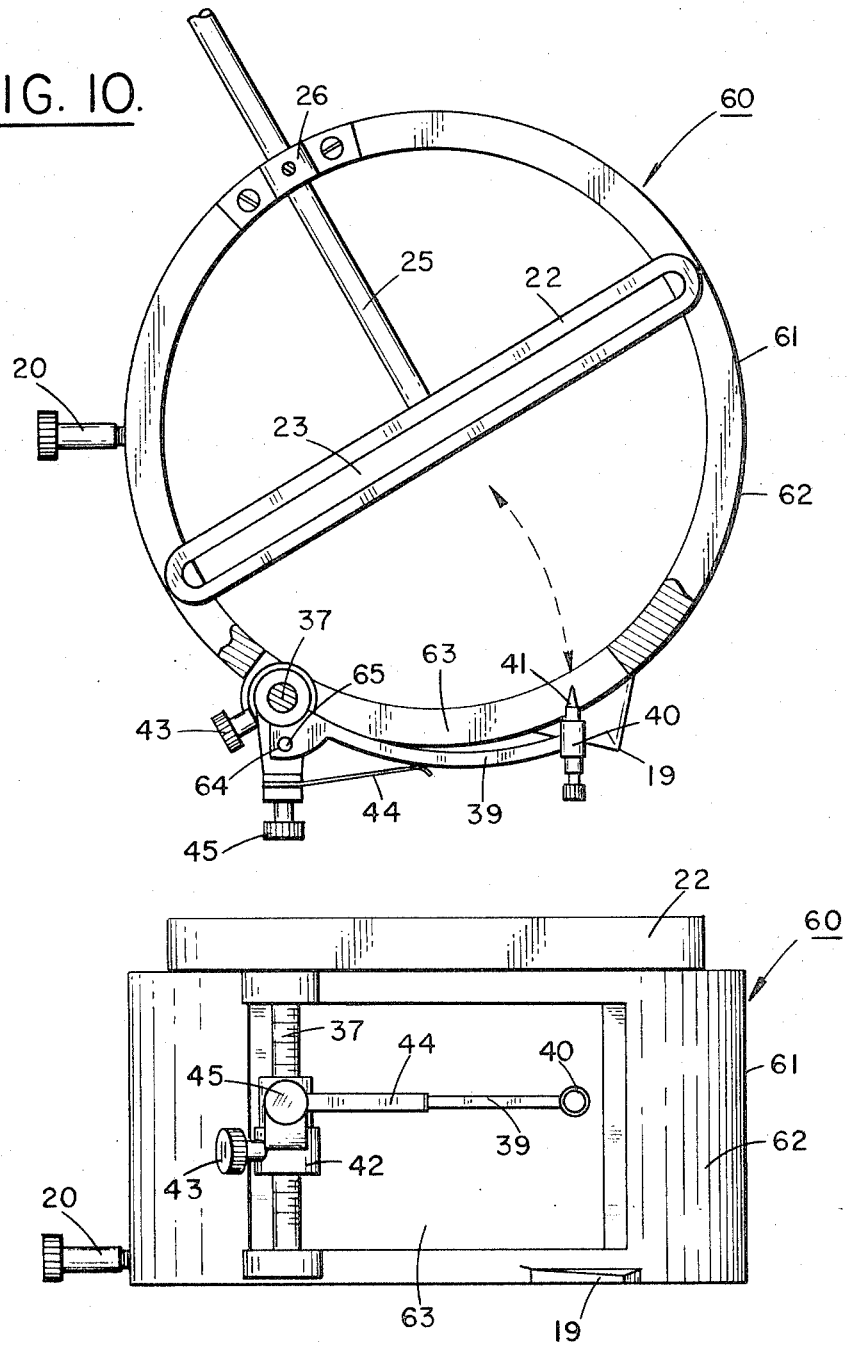
FIG. 10 is a top plan view of a modified scribing instrument.
FIG. 11 is an elevational view of the modified instrument.

The instrument shown in FIGS. 10 and 11 has the collar 18 and ring member 34 combined into a single rotatable assembly 60 which includes a collar 61 in whose cylindrical wall 62 there is formed a window 63. Since the parts used in assembly 60 are identical to those previously described in connection with ring 34 and collar 18, the same numerals will be hereinafter used to designate identical or similar parts.

Vertically mounted in window 63 is a post 37 which carries a horizontal scriber arm 39, in a manner described in connection with FIGS. 3 and 4. Arm 39 is modified slightly to provide a hole 64 which receives a pin 65 for locking arm 39 in its inoperative position, as shown in FIG. 11.

In operation, although the present instrument is adapted to apply trimming lines to both the maxillary and the mandibular castings, for simplicity of description, the description of the operation of the instrument will be limited to the marking of trim lines on maxillary castings only.

With partial reference to FIGS. 3-5, the maxillary casting 50 (a dental casting of a set of upper teeth) is positioned (FIG. 5) on base portion 12. The outline of the casting is represented (FIG. 3) by dotted line 51. Casting 50 is positioned in what is termed as the occlusal plane, which is determined by the several front teeth resting on a flat surface such as the surface of base portion 12. Dental putty 70 is applied between the rear teeth and base 12 to maintain casting 50 in the occlusal plane, as shown in FIG. 5.

The scriber arm 39 is positioned and set on post 37 at a level at which the casting is to be trimmed or cut off. The desired distance from base 12 to the trim line 47 is about 1.25 inches. The marker 41 is allowed to be biased inwardly against the outer periphery of casting 50, and ring 34 is then rotated in a clockwise direction on base 10 to scribe the line 47 about the outer periphery of casting 50. The casting is then removed from the instrument and trimmed or cut down to line 47 which is substantially parallel to the occlusal plane, as described above. The cut surface 72 (FIG. 7) is flat and is then used as a base for positioning the casting 50 for further marking, as shown in FIGS. 6 and 7.

Ring 34 is now removed from base 10 and is replaced by collar 18. The casting is now placed in the center of raised base portion 12 with its teeth facing upwardly, as shown in FIG. 7. A line A (FIG. 6), which represents the ridge, or "mid-palatal suture," or a middle section line, is determined as accurately as possible and drawn in, as shown. Pointer 19 is set on graduation numbered 18 of index 15, and the slotted marker guide 22 is moved over the center of collar 18 so that the centering marks 31 and 32 become aligned (FIG. 2A).

Casting 50 is manipulated by hand until it is in the center of base portion 12 and line A is aligned with the longitudinal center line of slot 23. Casting 50 is held in position on base portion 12 by means of a suitable dental putty 70 which is contained in bore 16 of base 10.

Prior to placing casting 50 on base portion 12, a line F is marked on the upwardly facing teeth (FIG. 6). Line F is drawn through the center of the last four jaw teeth and is used as a reference line for further trim markings.

Now, collar 18 is rotated so that pointer 19 points to the 0 graduation on index 15. Slotted marker guide 22 is moved to a position (FIG. 6) behind the rear teeth, and with marker pen 28, guided in slot 23, a line B is scribed on the upwardly facing casting. Line B is perpendicular to line A. Collar 18 is then rotated until slot 23 lines up with, or is parallel to, the previously marked line F. This parallelism may be sighted. A line C is then drawn and the reading of pointer 19 is noted on index 15. For the illustrated example, pointer 19 points to graduation 15.2 on scale 15. Collar 18 is again rotated until pointer 19 points to 15.2 on the opposite side of index 15. Guide 22 is moved to a position shown in FIG. 7 for scribing a line C' Both lines C and C' should be spaced symmetrically with respect to center line A. Collar 18 is rotated to position the scriber guide 22 for drawing a line E. The graduation opposite to the pointer is noted and collar 18 is turned to the opposite side of the scale until the pointer points to the same graduation. Scriber guide 22 is positioned and a line E' is drawn. Lines E and E' intersect on line A. The same procedure is then followed for drawing lines D and D'.

Line B represents the posterior margin, lines C and C' represent the lateral plane, and lines D and D' represent the posterior oblique plane.

Casting 50 is now removed from the instrument. Conventional methods are then used to grind down the casting to the drawn marker lines. The fully trimmed casting is shown in FIGS. 8 and 9.

Marking of the mandibular casting is accomplished in a similar manner, with the exception that both castings are now placed in occlusion, with the base plane 72 of casting 50 remaining flat on surface 12 of base 10. The castings are again held in position by means of the dental putty 70. By rotating ring 34, a line is drawn on the outer periphery of the mandibular casting. This line constitutes the base line for the casting. The operation hereinafter will be evident to those skilled in the dental art.

The lines drawn on casting 50 are for illustration purposes only, and need not be very accurate as far as spacing and angularity are concerned with regard to the outline of the teeth.

It will be apparent, therefore, that the present invention provides a means for easily and accurately performing scribing operations on dental castings and the like. Lines may be drawn even on undulated surfaces.

Having fully described and illustrated the instrument of the present invention, what I wish to claim as new and useful and secure by Letters Patent is:

1. An instrument for applying marking lines to the surfaces of a dental casting and the like, comprising:
   a circular base member,
   a circular track means formed on said base member and coaxially aligned therewith,
   a collar means coaxially and rotatably mounted on said track means, said collar means having a cylindrical wall extending a distance above said base member greater than the height of the dental casting to be marked, graduations on said base, said graduations indicating the angular position of said collar relative to said base, and marker guide means slidably arranged on the edge of said cylindrical wall of said collar means for movement back and forth in a fixed line of travel on both sides of the center line of said track means, said marker guide means having a marker guide at right angles to said fixed line whereby marking lines can be drawn on a casting positioned on said base below said guide means.

2. The instrument of claim 1 and further including a scriber coupled with said guide means to draw said lines.

3. The instrument of claim 1 wherein said marker guide means defines a longitudinal slot which, in use, accepts a scriber for drawing said lines on said casting dependent upon the position of said guide means on said collar means and upon the angular position of said collar means relative to said base member.

* * * * *